United States Patent [19]

Dershem et al.

[11] Patent Number: 5,064,480

[45] Date of Patent: Nov. 12, 1991

[54] WATER WASHABLE SOLDERING PASTE

[75] Inventors: Stephen M. Dershem, Santee; Richard R. Weaver, Poway, both of Calif.

[73] Assignee: Quantum Materials, Inc., San Diego, Calif.

[21] Appl. No.: 389,489

[22] Filed: Aug. 4, 1989

[51] Int. Cl.$^5$ ............................................. B23K 35/22
[52] U.S. Cl. ...................................... 148/22; 148/23; 148/24
[58] Field of Search ...................................... 148/22–24

[56] References Cited

U.S. PATENT DOCUMENTS

| 4,759,490 | 7/1988 | Ochiai et al. | 148/23 |
| 4,762,573 | 8/1988 | Beverstedt | 148/24 |
| 4,789,411 | 12/1988 | Eguchi et al. | 148/24 |
| 4,795,508 | 1/1989 | Van Leeuwen | 148/23 |
| 4,872,928 | 10/1989 | Jacobs | 148/24 |
| 4,895,606 | 1/1990 | Jafri | 148/24 |

Primary Examiner—Josephine Barr
Attorney, Agent, or Firm—Baker, Maxham, Jester & Meador

[57] ABSTRACT

Improved soldering paste for surface mounting of electronic components comprises a novel fluxing agent selected from formylated polyhydric compounds. The paste enables circuit boards to be washed with water to remove flux residues.

11 Claims, No Drawings

WATER WASHABLE SOLDERING PASTE

BACKGROUND OF THE INVENTION

The present invention relates to the art of assembling electronic devices, and more particularly, to an improved water washable soldering paste that permits printed circuit boards to be washed with water to remove flux residues.

Soldering pastes have been used for a number of years in the assembly of electronic components, such as integrated circuit packages which are attached to a base member, (i.e. a dielectric substrate) and electrically connected to a conductive circuit formed on or otherwise attached to the base member. A soldering paste is applied to selected regions of the conductive circuit by a screening process. Electronic components are then positioned on the base member and the entire assembly is fired in a heating chamber to bond the components to the conductive circuit.

A soldering paste may contain a soldering flux that functions to eliminate oxide contamination on the solder and on metal surfaces contacting the solder. Many of the organic components in soldering pastes and fluxes are vaporized during the soldering process, however some components leave residues that must be removed by organic solvents, specifically chlorofluorocarbons.

Attempts have been made in the past to develop soldering pastes and fluxes that leave no residue or leave a residue that can be removed with water, however these attempts have been unsuccessful for various reasons.

U.S. Pat. No. 2,898,255, granted Aug. 4, 1959 to Thompson et al., discloses the use of formic acid as a key component in a soldering flux which is reported to exhibit superior oxide removal. Formic acid boils at 100.5° C. and therefore does not remain as a corrosive residue subsequent to the soldering process. However, formic acid cannot be used in a soldering paste because upon prolonged contact with solder, the acid appears to generate lead and tin formates that prevent reflow, namely the ability of the solder to wet the metal surfaces to be bonded.

U.S. Pat. No. 3,223,561, granted Dec. 14, 1965 to Durham et al., discloses the use of an amine salt in a soldering flux. Although use of an amine salt eliminates the damage that occurs when an acid such as formic acid contacts the solder powder, the amine salt deposits a water insoluble white residue which appears to be tin oxide. Such residues are generally recognized as unacceptable.

SUMMARY OF THE INVENTION

The present invention relates to an improved soldering paste, and more particularly to a water washable soldering paste for surface mounting of electronic devices on circuit boards. According to the present invention, the soldering paste comprises solder powder and a soldering flux comprising a primary metal oxide removing substance selected from the group consisting of formylated polyhydric compounds and mixtures thereof. The soldering flux of the present invention may further comprise, in addition to primary metal oxide removing substance, organic solvent, a secondary metal oxide removing substance, resin and thixotropic agent.

DETAILED DESCRIPTION

The improved water washable soldering pastes of the invention comprise 80 to 95 weight percent solder powder and 5 to 20 weight percent of a soldering flux that essentially eliminates white residue formation. The soldering flux comprises a primary metal oxide removing substance. Optional flux components include solvent, a secondary metal oxide reducing substance, resin and thixotopic agent.

Suitable solvents which may be utilized in the soldering flux of the present invention include, for example, 2,2,4-trimethyl-1,3-pentanediol monoisobutyrate (Texanol), α-terpineol, cyclohenanedimethanol and mixtures thereof. Solvent comprises from about 0 to about 95 weight percent of the soldering flux.

The primary metal oxide removing substances utilized in the soldering flux are formylated polyhydric compounds which are reaction products of the formylating agent and a polyhydroxy compound selected from the group consisting of polyhydroxy aliphatic compounds and polyhydroxy resins. Suitable polyhydroxy aliphatic compounds include mannitol, tris(hydroxy)aminomethane, neopentyl glycol, sorbitol, triethanolamine, pentaerythritol and mixtures thereof. Preferred polyhydroxy aliphatic compounds are mannitol, tris(hydroxy)aminomethane, and neopentyl glycol. Polyhydroxy resins that may be used include polyvinyl alcohol, polyhydroxy ethyl cellulose, polyhydroxy propyl cellulose and the like. Agents that may be used to formylate polyhydric compounds employed herein include formic acid and formyl halides such as formyl bromide. Formic acid is preferred. Formulation is carried out by heating a polyhydric compound(s) with a large excess of formylating agent in the presence of a molecular sieve dessicant. The amount of formylating agent employed is 3 times that required to esterify each hydroxyl function and amidate any amino function present in the polyhydric compound. The reaction is carried out at a temperature of 40° C. to 90° C. for a period of 10 to 36 hours with continuous stirring. Thereafter the mixture is cooled to room temperature and the molecular sieve is removed by filtration. Excess formylating agent is removed on a rotary evaporator under vacuum until the weight loss, measured by thermogravimetric analysis, indicates that less than two percent formylating agent remains in the reaction mixture. The resulting formylated polyhydric compound comprises 5 to 100 weight percent of the soldering flux.

The soldering flux may also comprise a secondary metal oxide removing substance selected from the group consisting of N,N,N',N'-tetrakis(2-hydroxypropyl)ethylenediamine, alkanolamines and mixtures thereof. Examples of alkanolamines that may be utilized include, for example, triethanolamine and triisopropanolamine. Triethanolamine is preferred. The soldering flux may contain up to 30 weight percent alkanolamine and up to 40 weight percent N,N,N',N'-tetrakis (2-hydroxypropyl)ethylenediamine. The presence of a secondary metal oxide removing substance in the flux may permit reduction of the amount of primary metal oxide removing substance to less than 5 weight percent.

A resinous material may also be incorporated in the soldering flux. Suitable resins that may be employed include water soluble resins such as hydroxyethyl cellulose, hydroxypropyl cellulose, polyethylene oxide, polyvinyl alcohol and mixtures thereof. The soldering flux may contain up to 10 weight percent water soluble resin.

The soldering flux may also contain a thixotropic agent. Suitable thixotropes include, for example, hydrogenerated castor oil, bentonite, fumed silica and the like. A mixture of thixotropes may also be used. The soldering flux may contain up to 10 weight percent thixotrope. The purpose of incorporating a resin and/or thixotrope in the flux is to provide a composition which has the appropriate rheology, namely high viscosity at low shear.

The soldering flux of the invention can be formulated by first combining solvent and metal oxide removing substance and subjecting the mixture to the action of a high speed mechanical blender. Thereafter a water soluble resin may be slowly added while the temperature of the reaction mixture is allowed to increase to 50° to 70° C. Stirring is continued until the resin is completely dissolved. If desired, a thixotropic agent may be added to the reaction mixture at this point and stirring is then continued for an additional 20 to 30 minutes. When the flux contains a resin, a preferred method of formulation comprises dissolving the resin in the solvent prior to the addition of other flux components to the dissolved resin. The resulting flux is mixed with solder powder in a Hobart mixer to obtain the improved water washable solder paste of the invention.

In addition to use in soldering pastes, the novel soldering flux of the invention may be used for other soldering applications such as wave soldering.

Solder alloys that may be used in the pastes of present invention include powder alloys that preferably melt at or below 250° C. Caution must be exercised when using solders that melt at temperatures in excess of 250° C. since carbonization of certain metal oxide removing substances can occur at high temperatures. Particularly suitable solders include those containing from 35 to 95 weight percent tin (Sn) and from 5 to 65 weight percent lead (Pb). Examples of such solders include 60/40 Sn/Pb and 63/37 Sn/Pb. Additional solders that can be utilized in the present invention include those containing tin, lead and silver (Ag). Examples of such solders include 62.5/36.1/1.4 Sn/Pb/Ag and 60/36/4 Sn/Pb/Ag. Solder comprises from 80–95 weight percent of the soldering paste.

The improved water washable soldering paste of the invention is useful for surface mounting of electronic components such as chip capacitators, resistors and integrated circuits on circuit boards. Because it is water washable, the soldering paste of the invention allows ordinary water to be used to remove flux residues although in some instances it may be desirable to add a small amount (e.g. one percent) of saponifier to the wash water. Solder pastes currently in use require the use of either chlorofluorocarbon solvents or concentrated caustic saponifiers to effect removal of flux residues. The continued use of chlorofluorocarbons is extremely worrisome in the environment since these materials are reportedly the agents responsible for destroying the ozone layer. Depletion of the ozone layer contributes to increased UV exposure which is the primary cause of skin cancer.

The following examples are provided for the purpose of further illustration only and are not intended to be limitations on the disclosed invention.

EXAMPLE I

Preparation of formylated tris(hydroxymethyl)aminomethane

Tris(hydroxymethyl)aminomethane is spread to a depth of approximately 1 inch in shallow trays and dried at 75° C. in an air circulating oven for 10 hours. Thereafter, approximately 6.25 Kg of the dried tris(hydroxymethyl)aminomethane is slowly added with stirring to 11.79 Kg of 99+% formic acid and 2.56 Kg of 4A molecular sieves in a 6.5 gallon carboy. The reaction mixture is heated to 65° to 75° C. and stirring is continued at this temperature range. After 15 to 24 hours, the reaction mixture is allowed to cool to room temperature and the sieve beads and fragments are removed by filtration. Excess formic acid is then removed on a rotary evaporator under vacuum until the formylated tris(hydroxymethyl)aminomethane produce exhibits less than 2% weight loss at 100° C., as measured by thermogravimetric analysis.

EXAMPLE II

Preparation of soldering flux

Hydroxypropyl cellulose (1 Kg) is added to 21 Kg of 2,2,4-trimethyl-1,3-pentanediol monoisobutyrate and the mixture is stirred at high speed for 2 hours with the temperature not exceeding 65° C. Thereafter 10 Kg of formylated tris(hydroxymethyl)aminomethane prepared in EXAMPLE I, 7.5 Kg of triethanolamine and 10 Kg of N,N,N',N'tetrakis(2-hydroxypropy)ethylinediamine are added to the dissolved resin and the mixture is subjected to the action of high speed mixing. After 30 minutes, the temperature is adjusted to 50° C. and 0.5 Kg of hydrogenated castor oil is added to the mixture with stirring. The temperature is maintained between 50° and 60° C. while stirring is continued for another 50 minutes.

EXAMPLE III

Preparation of soldering flux

A mixture of 11 Kg cyclohexanedimethanol, 11 Kg of 2,2,4-trimethyl-1,3-pentanediol monoisobutyrate, 9.9 Kg of formylated tris(hydroxymethyl)aminomethane, 7.5 Kg of triethanolamine and 20 g of N,N,N',N'-tetrakis (2-hydroxypropyl)ethylenediamine is subjected to the action of a high speed mixer for 10 minutes. Thereafter, the temperature is adjusted to 50° C. and 0.75 Kg of hydrogenated castor oil is added and stirring is continued for 50 minutes.

EXAMPLE IV

Soldering Paste

A water washable soldering paste is formulated by mixing 44.5 Kg of solder having a Sn:Pb:Ag ratio of 62/36/2 and 5 Kg of soldering flux prepared according to EXAMPLE II. The mixing is carried out in a Hobart mixer for 30 minutes. After mixing is complete, the viscosity is adjusted by the addition of an additional 0.5 Kg of solvent.

Based on this disclosure, many other modifications and ramifications will naturally suggest themselves to those skilled in the art. These are intended to be comprehended as within the scope of this invention.

What is claimed is:

1. A soldering paste comprising:
    80 to 95 weight percent solder alloy melting at or below 250° C.; and
    5 to 20 weight percent soldering flux comprising 0 to 95 weight percent organic solvent and 5 to 100 weight percent of a metal oxide removing substance selected from the group consisting of formylated polyhydric compounds and mixtures thereof, said polyhydric compounds selected from polyhydroxy aliphatic compounds and polyhydroxy resins.

2. A paste according to claim 1 wherein said formylated polyhydric compounds are formulated derivatives of polyhydroxy aliphatic compounds selected from the group consisting of mannitol, tris(hydroxymethyl)aminomethane and neopentyl glycol.

3. A paste according to claim 1 wherein said flux further comprises a second metal oxide removing substance selected from the group consisting of N,N,N',N'-tetrakis(2-hydroxypropyl)ethylenediamine, in an amount up to 40 weight percent, and triethanolamine and trisopropanolamine, in an amount up to 30 weight percent, and mixtures thereof.

4. A paste according to claim 3 wherein said second metal oxide removing substance is triethanolamine.

5. A paste according to claim 3 wherein said flux further comprises up to 10 weight percent water soluble resin selected from the group consisting of hydroxyethyl cellulose, hydroxypropyl cellulose, polyethylene oxide and polyvinyl alcohol and mixtures thereof.

6. A paste according to claim 5 wherein said flux further comprises up to 10 weight percent thixotropic agent selected from the group consisting of hydrogenated castor oil, bentonite and fumed silica and mixtures thereof.

7. A paste according to claim 3 wherein said flux further comprises up to 10 weight percent thixotropic agent selected from the group consisting of hydrogenated castor oil, bentonite and fumed silica and mixtures thereof.

8. A paste according to claim 1 wherein said flux further comprises up to 10 weight percent water soluble resin selected from the group consisting of hydroxyethyl cellulose, hydroxypropyl cellulose, polyethylene oxide and polyvinyl alcohol and mixtures thereof.

9. A paste according to claim 8 wherein said flux further comprises up to 10 weight percent thixotropic agent selected from the group consisting of hydrogenated castor oil, bentonite and fumed silica and mixtures thereof.

10. A paste according to claim 1 wherein said flux further comprises up to 10 weight percent thixotropic agent selected from the group consisting of hydrogenated castor oil, bentonite and fumed silica and mixtures thereof.

11. A soldering paste comprising:
 80 to 95 weight percent solder alloy melting at or below 250° C.;
 5 to 20 weight percent soldering flux comprising:
  0 to 95 weight percent 2,2,4-trimethyl-1,3-propanediol monoisobutyrate;
  5 to 100 weight percent formylated tris(hydroxymethyl)aminomethane;
  up to 40 weight percent N,N,N',N'-tetrakis(2-hydroxypropyl(ethylenediamine;
  up to 10 weight percent hydroxypropyl cellulose; and
  up to 10 weight percent hydrogenated castor oil.

* * * * *